UNITED STATES PATENT OFFICE.

JUDSON ALBERT DE CEW, OF MONTREAL, QUEBEC, CANADA.

PRESERVED WOOD AND PROCESS OF MAKING SAME.

1,010,122.      Specification of Letters Patent.      Patented Nov. 28, 1911.

No Drawing.      Application filed January 10, 1910. Serial No. 537,141.

*To all whom it may concern:*

Be it known that I, JUDSON ALBERT DE CEW, a subject of the King of England, residing in the city of Montreal, in the Province of Quebec, Dominion of Canada, have made a new and useful Improvement in Preserved Wood and Processes of Making Same, of which the following is a specification.

The object of my invention is to provide a wood product which is resistant to the attack of ferments, fungi, and insects; at the same time to produce a rapidly seasoned product from unseasoned wood; and to produce a wood product which is artificially rendered harder, more lignified and less inflammable.

A further object is to provide a method whereby a soft wood may be rendered harder and less inflammable, and which may be rapidly carried on, by the application of waste sulfite liquor.

My invention consists of the products herein described and claimed and the steps of the method herein set forth.

In carrying my process into effect, to produce the product, the wood bodies to be treated are subjected to the action of what is generally termed "waste sulfite liquor," and I use it in a partly concentrated condition having a specific gravity, of say from 1.1 to 1.2. The period of treatment, temperatures and pressures vary according to the results desired. This aqueous material, as it is prepared and sold by pulp manufacturers, may be slightly acid, neutral, or alkaline, according to the method of concentration.

In carrying out my process, wood, in the form of boards, deal or the like, is placed in a closed tank and subjected to a steaming process after which the steam and air are withdrawn from the tank and its contents by a vacuum pump or any other suitable means. By withdrawing the air and steam from the material, the wood is left free to readily absorb the waste sulfite liquor. The wood is then immersed in a solution of waste sulfite liquor of a density of approximately 20% Bé. and absorption in this liquor takes place, which absorption may be increased by subjecting the contents of the vessel, in which the wood is placed, to pressure. After the mass has been allowed to cool, the excess liquor is removed and the operation for certain purposes may be repeated; *i. e.* the boards are again steamed, the air and moisture are withdrawn by vacuum, and the matter is again subjected to the impregnation of waste sulfite liquor under pressure. As a result of the impregnation and absorption of organic material, the weight of the dry wood is increased by from 10% to 15%.

The effects of the treatment, immersion, or impregnation on the materials treated are as follows:

(*a*) If the material is an unseasoned product, a rapid seasoning takes place, because the albuminous matter of the wood is rendered insoluble and sterile by the tanning and astringent properties of the waste sulfite liquor. These astringent properties exist as long as the waste sulfite liquor remains acid. The acids present may be both organic or mineral but the liquor does not lose its astringent properties if the mineral acids are neutralized and not until the product has been rendered alkaline.

(*b*) The sterilizing action of the sulfonic compounds of the sulfite waste produces a material which is very resistant to the attacks of ferments, fungi, and insects, so that the product will last a long time, because these compounds are held in close physical or chemical combinations by the absorption thereof by the fibrous constituents of the wood.

(*c*) The woody matter is rendered stronger because the waste sulfite liquor serves to coat the fibers with a binding or cementing material analogous in composition to lignone,—the ducts and cell spaces between summer and winter layers of growth being also charged with this binding material. The product may thus be said to have become more lignified, making it denser and harder.

(*d*) The physical properties of the wood are materially changed in that it is given a greater density, strength and hardness,— the latter property being desirable for the purpose of finishing the material after treatment so that it may be polished. A further physical change is that the product after treatment is less inflammable, as the absorbed matter is less easily burned than the fiber of the wood and it fills the air spaces of the wood and expels the air therefrom.

While the above examples particularly describe wood as the material to be operated on, this should be understood to include any fibro-cellular material capable of receiving the treatment of the method herein described.

Having thus fully described my invention what I claim as new and desire to secure by Letters Patent is:

1. The herein described product consisting of a fibro-cellular body treated with waste sulfite liquor exclusively.

2. The herein described product consisting of a fibro-cellular body impregnated with waste sulfite liquor exclusively.

3. The herein described method which consists in treating a fibro-cellular body with waste sulfite liquor exclusively.

4. The herein described method which consists in treating a fibro-cellular body with waste sulfite liquor exclusively under the action of pressure.

5. The herein described method which consists in treating a fibro-cellular body with waste sulfite liquor under the action of heat and pressure.

In witness whereof I have hereunto set my hand in the presence of two witnesses.

JUDSON ALBERT DE CEW.

Witnesses:
B. WESTON,
JOHN H. THORNELL.